Oct. 13, 1925.

H. H. HARBECKE

RELAY

Filed Aug. 16, 1923

1,556,599

Inventor—
Herman H. Harbecke
Chas. W. Candy Atty.

Patented Oct. 13, 1925.

1,556,599

UNITED STATES PATENT OFFICE.

HERMAN H. HARBECKE, OF CHICAGO, ILLINOIS, ASSIGNOR TO AUTOMATIC ELECTRIC COMPANY, OF CHICAGO, ILLINOIS, A CORPORATION OF ILLINOIS.

RELAY.

Application filed August 16, 1923. Serial No. 657,660.

*To all whom it may concern:*

Be it known that I, HERMAN H. HARBECKE, a citizen of the United States of America, and a resident of Chicago, Cook County, and State of Illinois, have invented certain new and useful Improvements in Relays, of which the following is a specification.

This invention relates in general to dashpot relays and its object, broadly stated, is to provide a new and improved dashpot for a relay of this type. More specifically, the object of the invention is to provide a dashpot in which the piston rod is directly connected to the ball valve, thus insuring a positive opening of the valve, and providing for a slight blow against the piston at each operation to prevent sticking.

Figure 3:
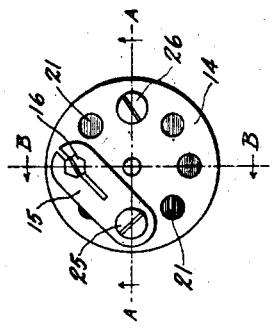
Figure 2:
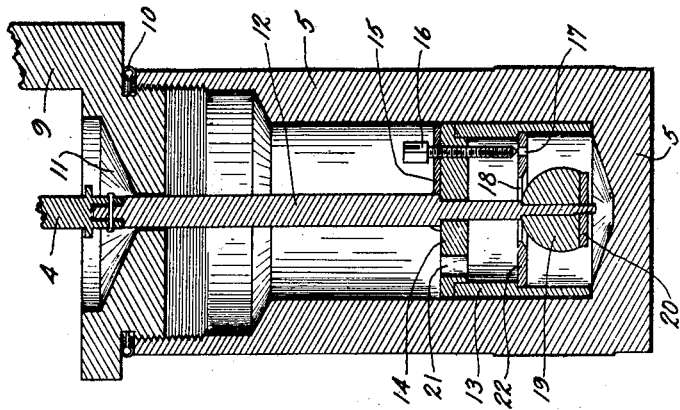
Figure 1:
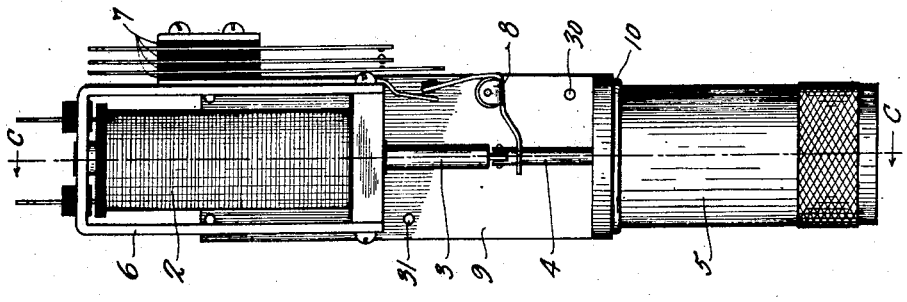

To accomplish the foregoing and other useful ends this invention comprises means which will be fully described in the specification which is to follow, reference being had to the accompanying drawing, in which Fig. 1 is a front view of the entire relay; Fig. 2, a vertical section of a part of the relay on the line CC, Fig. 1, including a vertical section of the piston on the line BB, Fig. 3; Fig. 3, a top view of the piston, with its cap, the needle valve adjustment screw and its tension plate in place; and Fig. 4, a vertical section of the piston on the line AA, Fig. 3.

Similar numerals refer to similar parts throughout the several views.

The dashpot relay illustrated comprises essentially an operating magnet, a solenoid in this case, a set of contact springs adapted to be operated by the solenoid plunger rod, and a dashpot for delaying or slowing up the operation of the plunger when it is attracted. The release of the plunger, it may be stated, is not delayed by the dashpot and takes place very quickly, therefore. Relays of this general type are well understood and need not be described in detail, except in so far as the new features are involved. It may be mentioned, however, that a dashpot relay is used in a circuit where delayed operation or slow action is required, as for example where it is desired to operate an alarm or other signal after the expiration of a predetermined time interval.

The mounting bracket 9, as shown in Figs. 1 and 2, is cast metal, finished and drilled for mounting heel piece 6, pawl or bell crank 8, and for being itself mounted in an upright position by screws passing through the staggered screw holes 30 and 31, Fig. 1. The bottom or extended portion of the bracket has a hole drilled through it to permit free movement of the piston rod 12, has a reservoir 11 to hold the slight quantity of escaping oil, and is threaded to hold the dashpot 5, as shown in Fig. 2. Between the mounting bracket 9 and dashpot 5 there is a gasket 10 for preventing a leakage of oil.

The heel piece 6, shown in Fig. 1, is a metal strip bent and drilled for mounting the spring assembly 7, the solenoid 2, and for permitting terminals to be brought through insulating bushings at its upper end for making connections.

The dashpot 5, Figs. 1 and 2, is a metal cylinder drilled out to accommodate the piston numbered 13, 14, 22, etc., and to hold the oil or other suitable liquid, through which the latter operates.

The plunger rod 3 of the solenoid is connected with the piston rod 12 by means of a link or connecting rod 4, the connections being made by rivets, or pins with flattened ends, or other suitable means, as shown in Figs. 1 and 2. The connecting rod has a collar at its lower end which controls the operation of the bell crank 8, Fig. 1. The bell crank in turn controls the operation of the springs in spring assembly 7.

Figure 4:
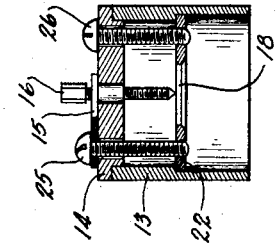

The piston assembly consists of a vertical cylindrical member 13 having a shoulder on the inside against which rests the horizontal valve member 22, as shown in Figs. 2 and 4. The horizontal valve member has two valve openings, 17 and 18, the former quite small while the latter is much larger. The piston has a cap 14, as shown in Figs. 2, 3 and 4, containing several holes 21 for the free passage of oil during either movement of the piston. This cap and the horizontal valve member are pulled up tight and held in place by the screws 25 and 26, best shown in Fig. 4. Screw 25 also holds the tension plate 15 which acts to hold the "needle" valve adjustment screw 16 in place, as shown in Figs. 2, 3 and 4.

The piston rod 12, shown in Fig. 2, has two shoulders, the upper one of which, in its unoperated or released position, rests against the cap 14, and the lower one, against which the valve ball 19 is held by the nut 20. The shoulders are spaced, or the size of the opening 18 varied, so as to give the desired flow of oil or releasing action.

Having briefly explained the purpose of the invention and the apparatus involved in carrying it out, its operation may now be explained more in detail. For this purpose it will be assumed that the dashpot 5 is filled with the proper amount and kind of oil.

When the solenoid 2 is energized, the steel ball 19 is raised to press against the seat of the valve opening 18, thus closing the opening and acting as a lift for the piston. The ball upon coming in contact with the valve seat strikes it a slight blow which acts to give the piston a start, thus preventing sticking. The needle valve opening 17 now entirely controls the flow of oil through the piston and makes it slow to pull up, its speed depending upon the size of the opening which is regulated by the adjustment screw 16. The desired slow operation is completed when the contacts of the springs in the assembly 7 are closed by the bell crank 8 through contact with the collar of the connecting rod 4 in its upward movement. The piston remains in its pulled up or operated position as long as the solenoid 2 remains energized.

When the solenoid 2 is deenergized, the solenoid plunger rod 3 is released and falls down by gravity, thereby allowing the connecting rod 4, piston rod 12 and valve ball 19 to also fall. The connecting rod in falling releases the bell crank 8, which in turn allows the springs in assembly 7 to return to normal. The valve ball in falling clears the opening 18 for an active oil flow. The piston rod in falling strikes the piston cap 14 a slight blow with its shoulder, which acts the same as the blow in the upward movement of the piston. The piston falls down by gravity, being assisted by the weight of the rods 3, 4, 12 and their attachments, the opening 18 being large enough to offer but very little resistance to the downward movement of the piston through the oil, thus making it quick to restore.

A dashpot constructed in the manner described in the foregoing has numerous advantages, among which may be pointed out the following: In the first place, the provision by which the piston is given a slight blow at the beginning of each upward and downward movement is very effectual in preventing sticking, as mentioned before. The blow at the beginning of the downward movement also insures that the piston will be restored each time during a succession of short impulses which might otherwise cause the piston to gradually creep up due to their accumulative effect. The scheme of mounting the ball directly on the piston rod insures a positive opening of the valve and at the same time prevents the ball from rotating in its seat between successive operations. The latter point is of value in securing a tight seat, since if the ball turned relative to the piston slight irregularities in its surface or in the surface of the seat might at times cause a leak. Finally the ball is held against the seat with much more force than in the constructions formerly used because the piston is supported and drawn upward against the oil by means of the piston acting through the ball. In other words, the ball lifts the piston, and since the piston comprises the greater part of the area presented to the oil, the pressure on the seat is greater than it would be with a piston operated direct by the piston rod and a simple ball valve.

Having described my invention, what I consider to be new and desire to have protected by Letters Patent will be pointed out in the appended claims.

What is claimed is:

1. In a dashpot relay, the combination of a piston with a shouldered piston rod carrying a steel valve ball, said shoulder and ball being spaced to operate loosely a limited distance independent of said piston, thus giving the latter a slight blow at the start of each directive movement, substantially as described.

2. In a dashpot, a piston having a small aperture therein which is always open, said piston also having a relatively large aperture closed when the piston is raised, a valve for closing said large opening, and a piston rod for raising the piston loosely attached thereto so as to provide for a slight blow against the piston at the beginning of the upward movement and release in order to prevent sticking.

3. In a dashpot, a cylinder, a piston in said cylinder comprising a tubular member, two plates held separated but clamped to said piston by screws, a shaft for operating said piston, a ball on the end of said shaft co-operating with an aperture in one of said plates to form a ball valve, a second aperture in said last plate and an adjusting screw in the other plate co-operating with the last mentioned aperture to form a needle valve, and means for transmitting motion to the shaft for first closing the ball valve and for thereafter elevating the piston at a speed regulated by the needle valve.

4. In a dashpot, a cylinder, a piston in said cylinder comprising a tubular member, two plates held separated but clamped to said piston by screws, a shaft for operating said piston, a ball on the end of said shaft co-operating with an aperture in one of said plates to form a ball valve, a second aperture in said last plate and an adjusting screw in the other plate co-operating with the last mentioned aperture to form a needle valve, means for transmitting motion to the shaft for first closing the ball valve and for thereafter elevating the piston at a speed regulated by the needle valve, and means for causing the shaft to drop by gravity for a distance to open the ball valve and to thereafter engage the piston to restore the same to its initial position.

5. In a dashpot, a cylinder containing liquid, a piston in the cylinder having a valve to permit free movement in one direction and to retard movement in the other direction, a shaft for moving the cylinder, said shaft carrying a valve closing element on one end thereof and having free movement through the cylinder for a certain distance, means for maintaining the valve open when the piston stands at normal, said shaft rising independent of the piston for a certain distance and then engaging the same to close the valve and move the piston.

6. In a dashpot, a fluid chamber, a piston movable therein, a shaft for moving said piston, said shaft having a free movement through the piston, two shoulders on the shaft, one engaging the piston to move the same in only one direction, and the other engaging the piston to move the same only in another direction, said shaft disengaging one shoulder from the piston and engaging the other therewith each time the shaft moves the piston.

7. In a dashpot relay, a piston divided into two cup shaped sections, two valves connecting said sections, means for closing one of said valves and for thereafter elevating said piston at a speed determined by the other of said valves, and means for variably adjusting said last valve to obtain the action desired.

8. In a dashpot, a closed cylinder, a piston mounted therein having a valve seat, a shaft carrying an element for closing said valve, said piston normally engaging the base of said cylinder and holding the valve seat out of engagement with the element, means for raising the shaft to first engage the element in the valve seat to close the valve and to then carry the piston to the upper end of the cylinder, said shaft when returning to normal having means for engaging the cylinder to also move it to normal.

In witness whereof, I hereunto subscribe my name this 13th day of August, A. D., 1923.

HERMAN H. HARBECKE.